US009081909B2

(12) United States Patent
Chu et al.

(10) Patent No.: US 9,081,909 B2
(45) Date of Patent: Jul. 14, 2015

(54) ELECTRONIC DEVICE AND METHOD FOR SWITCHING MODES OF THUNDERBOLT CONNECTOR THEREOF

(71) Applicants: Chen-Yi Chu, Taipei (TW); Chih-Pang Hsu, Taipei (TW); Ching-Hang Chen, Taipei (TW)

(72) Inventors: Chen-Yi Chu, Taipei (TW); Chih-Pang Hsu, Taipei (TW); Ching-Hang Chen, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 322 days.

(21) Appl. No.: 13/684,141

(22) Filed: Nov. 21, 2012

(65) Prior Publication Data

US 2013/0145071 A1    Jun. 6, 2013

Related U.S. Application Data

(60) Provisional application No. 61/566,006, filed on Dec. 2, 2011.

(30) Foreign Application Priority Data

Jul. 10, 2012   (TW) .............................. 101124809 A

(51) Int. Cl.
*G06F 13/40*   (2006.01)
*G06F 13/00*   (2006.01)
*G06F 13/38*   (2006.01)

(52) U.S. Cl.
CPC .......... *G06F 13/4022* (2013.01); *G06F 13/385* (2013.01); *G06F 13/4068* (2013.01); *G06F 2213/0026* (2013.01)

(58) Field of Classification Search
CPC ....... G06F 13/38; G06F 13/385; G06F 13/40; G06F 13/4004; G06F 13/4022; G06F 13/4063
USPC ............. 710/104–106, 305–306, 311–317, 8, 710/10, 13–14
See application file for complete search history.

(56) References Cited

U.S. PATENT DOCUMENTS

| | | | |
|---|---|---|---|
| 6,845,409 B1 | 1/2005 | Talagala et al. | |
| 2004/0153597 A1 | 8/2004 | Kanai et al. | |
| 2004/0230735 A1 | 11/2004 | Moll | |
| 2008/0172501 A1 | 7/2008 | Goodart et al. | |
| 2013/0106874 A1* | 5/2013 | Sun et al. ...................... | 345/520 |

OTHER PUBLICATIONS

TeamVR. "Intel planning three new Thunderbolt controllers, one set to lower device cost". VR Zone. Online Sep. 29, 2011. Retrieved from Internet Nov. 24, 2014. <http://vr-zone.com/articles/intel-planning-three-new-thunderbolt-controllers-oneset-to-lower-device-cost/13664.html>.*

(Continued)

*Primary Examiner* — Thomas J Cleary
(74) *Attorney, Agent, or Firm* — Jianq Chyun IP Office

(57) ABSTRACT

An electronic device and a method for switching mode of a Thunderbolt connector thereof are provided. The electronic device includes a core unit, a PCIe device, a Thunderbolt control unit, a first switch circuit and a second switch circuit. The Thunderbolt control unit has a host mode and an endpoint device mode. A common terminal of the first switch circuit is coupled to a PCIe port of the PCIe device. A first selection terminal of the first switch circuit is coupled to a first PCIe port of the core unit. A common terminal of the second switch circuit is coupled to a PCIe port of the Thunderbolt control unit. A first selection terminal of the second switch circuit is coupled to a second PCIe port of the core unit. A second selection terminal of the first switch circuit is coupled to a second selection terminal of the second switch circuit.

14 Claims, 12 Drawing Sheets

(56) References Cited

OTHER PUBLICATIONS

"Thunderbolt™ Technology". Intel Corporation. Jun. 2011.*
On-The-Go and Embedded Host Supplement to the USB Revision 2.0 Specification. Revision 2.0. LSI Corporation et al. May 8, 2009.*
Apple Inc, "Thunderbolt Device Driver Programming Guide," Dec. 21, 2011, pp. 1-pp. 21, Available at: http://developer.apple.com/library/mac/documentation/HardwareDrivers/Conceptual/ThunderboltDevGuide/ThunderboltDevGuide.pdf.
"Office Action of European Counterpart Application", issued on Jul. 23, 2014, p. 1-p. 6.

* cited by examiner

ELECTRONIC DEVICE AND METHOD FOR SWITCHING MODES OF THUNDERBOLT CONNECTOR THEREOF

CROSS-REFERENCE TO RELATED APPLICATION

This application claims the priority benefits of U.S. provisional application Ser. No. 61/566,006, filed on Dec. 2, 2011 and Taiwan application serial no. 101124809, filed on Jul. 10, 2012. The entirety of the above-mentioned patent applications is hereby incorporated via reference herein and made a part of specification.

BACKGROUND OF THE INVENTION

1. Field of the Invention

The invention relates to an electronic device and, more particularly, to a method for switching modes of a Thunderbolt connector.

2. Description of the Related Art

A conventional electronic device with a Thunderbolt connector can only execute one of the host mode and the end-point device mode, and it cannot switch between the host mode and the end-point device mode dynamically.

BRIEF SUMMARY OF THE INVENTION

An electronic device and a method for switching modes of a Thunderbolt connector are provided. The electronic device may be considered as a host or an end-point device via the method for switching modes of the Thunderbolt connector.

An electronic device is provided. The electronic device includes a core unit, a Peripheral Component Interconnect Express (PCIe) device, a Thunderbolt connecter, a Thunderbolt control unit, a first switch circuit and a second switch circuit. The core unit includes two PCIe ports. The PCIe device includes a PCIe port. The Thunderbolt connector is coupled to a connecting terminal of the Thunderbolt control unit. The Thunderbolt control unit can be set at a host mode or an end-point device mode dynamically. A first common terminal of the first switch circuit is coupled to a PCIe port of the PCIe device, and a first selection terminal of the first switch circuit is coupled to a first PCIe port of the core unit. A first common terminal of the second switch circuit is coupled to a first PCIe port of the Thunderbolt control unit. A first selection terminal of the second switch circuit is coupled to a second PCIe port of the core unit, and a second selection terminal of the second switch circuit is coupled to a second selection terminal of the second switch circuit.

A method for switching modes of the Thunderbolt connector is provided. The method includes providing a Thunderbolt control unit. The Thunderbolt control unit can be set at a host mode or an end-point device mode. The Thunderbolt control unit is coupled to the core unit of the electronic device and the PCIe device is coupled to the core unit when the Thunderbolt control unit is at the host mode. The PCIe device is coupled to the Thunderbolt control unit when the Thunderbolt control unit is at the end-point device mode.

Consequently, the electronic device can be both considered as a host and an end-point device by varying the connection among the core unit, the PCIe device and the Thunderbolt control unit by switching the first switch circuit and the second circuit.

DETAILED DESCRIPTION OF THE EMBODIMENTS

Figure 1:
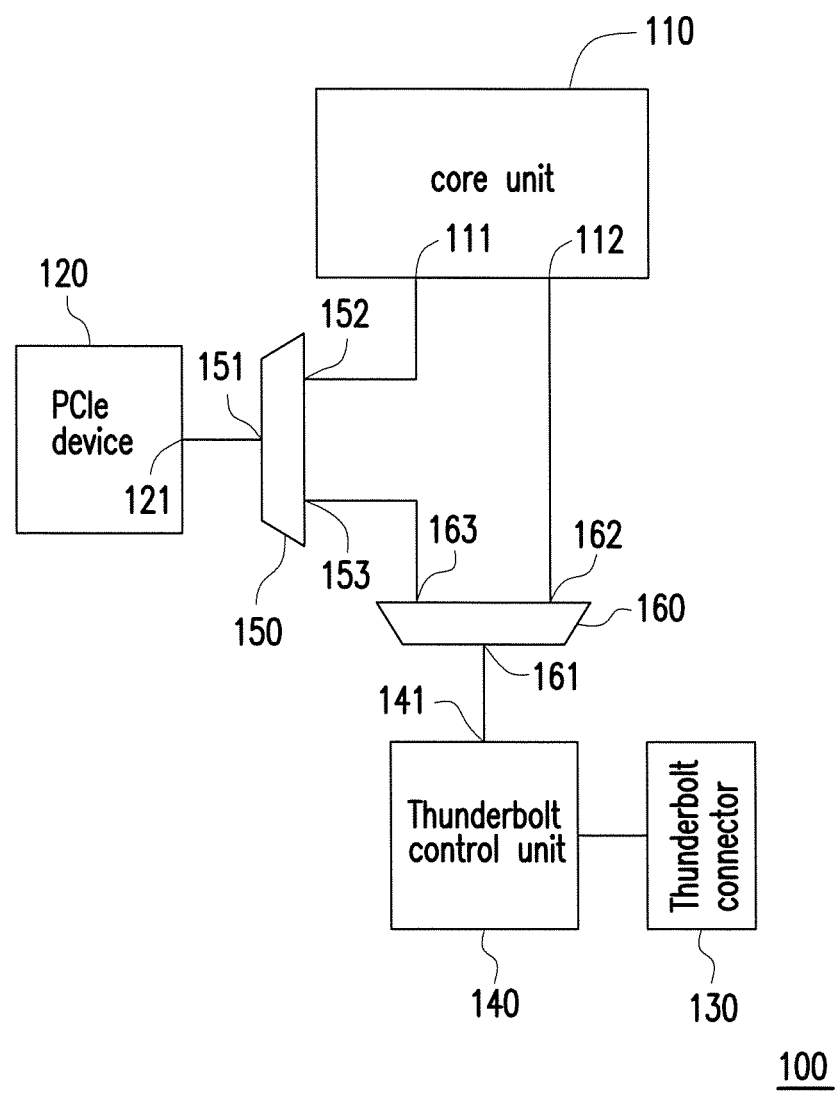
FIG. 1 is a block diagram showing an electronic device in a first embodiment.

FIG. 1 is a block diagram showing an electronic device 100 in a first embodiment. The electronic device 100 includes a core unit 110, a Peripheral Component Interconnect Express (PCIe) device 120, a Thunderbolt connector 130, a Thunderbolt control unit 140, a first switch circuit 150 and a second switch 160. The core unit 110 includes PCIe ports 111 and 112. The PCIe device 120 includes a PCIe port 121. The PCIe device 120 may be any device connected to a PCIe bus such as a Universal Serial Bus (USB) chip, a wireless local area network (WLAN) chip, and an External Serial Advanced Technology Attachment (eSATA) chip. The electronic device 100 may be connected to different peripheral devices via different PCIe devices.

The Thunderbolt connector 130 is coupled to a connecting terminal of the Thunderbolt control unit 140. The Thunderbolt control unit 140 is connected to external Thunderbolt devices via the Thunderbolt connector 130. The Thunderbolt control unit 140 can be set at a host mode or an end-point device mode dynamically. The host mode may be a router mode, which is not limited herein. When the Thunderbolt control unit 140 operates at the host mode, the electronic device 100 is considered as a Thunderbolt host. When the Thunderbolt control unit 140 operates at the end-point device mode, the electronic device 100 is considered as an end-point device.

The first switch circuit 150 and the second switch circuit 160 may be any circuit with the function of connecting and switching signals, such as a Q-switch, a multiplexer, or a switch. The first switch circuit 150 can connect a common terminal 151 to one of the selection terminals 152 and 153 selectively. The second switch circuit 160 can connect a common terminal 161 to the one of the selection terminals 162 and 163 selectively. The common terminal 151 of the first switch circuit 150 is coupled to the PCIe port 121 of the PCIe device 120. The selection terminal 152 of the first switch circuit 150 is coupled to the PCIe port 111 of the core unit 110. The common terminal 161 of the second switch circuit 160 is coupled to the PCIe port 141 of the Thunderbolt control unit 140. The selection terminal 162 of the second switch circuit 160 is coupled to the PCIe port 112 of the core unit 110. The selection terminal 163 of the second switch circuit 160 is coupled to the selection terminal 153 of the first switch circuit 150.

The Thunderbolt control unit 140 may selectively operate at the host mode or the end-point device mode according to the commands of a user, and it also may be operated at the host mode or the end-point device mode according to whether the core unit 110 is enabled. The method for enabling and disabling the core unit 110 may be any method according to the requirements of products. For example, when the core unit 110 operates at a sleep mode (such as the S3 mode), the hibernation mode (such as the S4 mode) or the power off mode or in any other disable mode, the Thunderbolt control unit 140 operates at the end-point device mode, which is not limited herein. For example, when the core unit 110 operates at a normal mode, the PCIe ports 111 and 112 of the core unit 110 are disabled or turned off. At the moment, although the core unit 110 operates at the normal mode, it is disabled for the thunder control unit 140. When the PCIe ports 111 and 112 are disabled, the Thunderbolt control unit 140 may operate at the end-point device mode.

When the core unit 110 is at the normal mode (such as the S0 mode or other enable mode), the Thunderbolt control unit 140 may operate at the host mode, which is not limited herein.

When the thunder control unit 140 operates at the host mode, the common terminal 151 of the first switch circuit 150 is coupled to the selection terminal 152 of the first switch circuit 150, and the common terminal 161 of the second switch circuit 160 is coupled to the selection terminal 162 of the second switch circuit 160. The PCIe device 120 and the Thunderbolt control unit 140 are coupled to the PCIe ports 111 and 112 of the core unit 110 respectively, and the PCIe device 120 is not coupled to the Thunderbolt control unit 140. Consequently, the electronic device 100 can be considered as the Thunderbolt host, and the core unit 110 can use the PCIe device 120 via the PCIe port 111 and the first switch circuit 150. The core unit 110 can also use the external end-point devices (such as a hard disk drive, a display, a network or any other external end-point device) connected to the Thunderbolt connector 130 via the PCIe port 112, the second switch circuit 160 and the Thunderbolt control unit 140.

When the Thunderbolt control unit 140 operates at the end-point device mode, the core unit 110 may be disabled (such as in the S3 mode, S4 mode, S5 mode or other disable modes) or enabled (or in a normal mode). The Thunderbolt control unit 140 also may be set to operate at the end-point device mode or the host mode dynamically when the core unit 110 is enabled (or in a normal mode).

The common terminal 151 of the first switch circuit 150 is coupled to the selection terminal 153 of the first switch circuit 150. The common terminal 161 of the second switch circuit 160 is coupled to the selection terminal 163 of the second switch circuit 160. Consequently, the core unit 110 is not coupled to the PCIe device 120 and the Thunderbolt control unit 140, and the PCIe device 120 is coupled to the Thunderbolt control unit 140. Therefore the electronic device 100 can be used as a Thunderbolt end-point device. That is, the external Thunderbolt host can use the PCIe device 120 in the electronic device 100 via the Thunderbolt connector 130, the Thunderbolt control unit 140, the second switch circuit 160 and the first switch circuit 150. Consequently, the user can use electronic devices such as a notebook in the Thunderbolt host mode to use the interface and resource connected to the PCIe device 120 via the Thunderbolt connector 130 and the Thunderbolt control unit 140.

Figure 2:
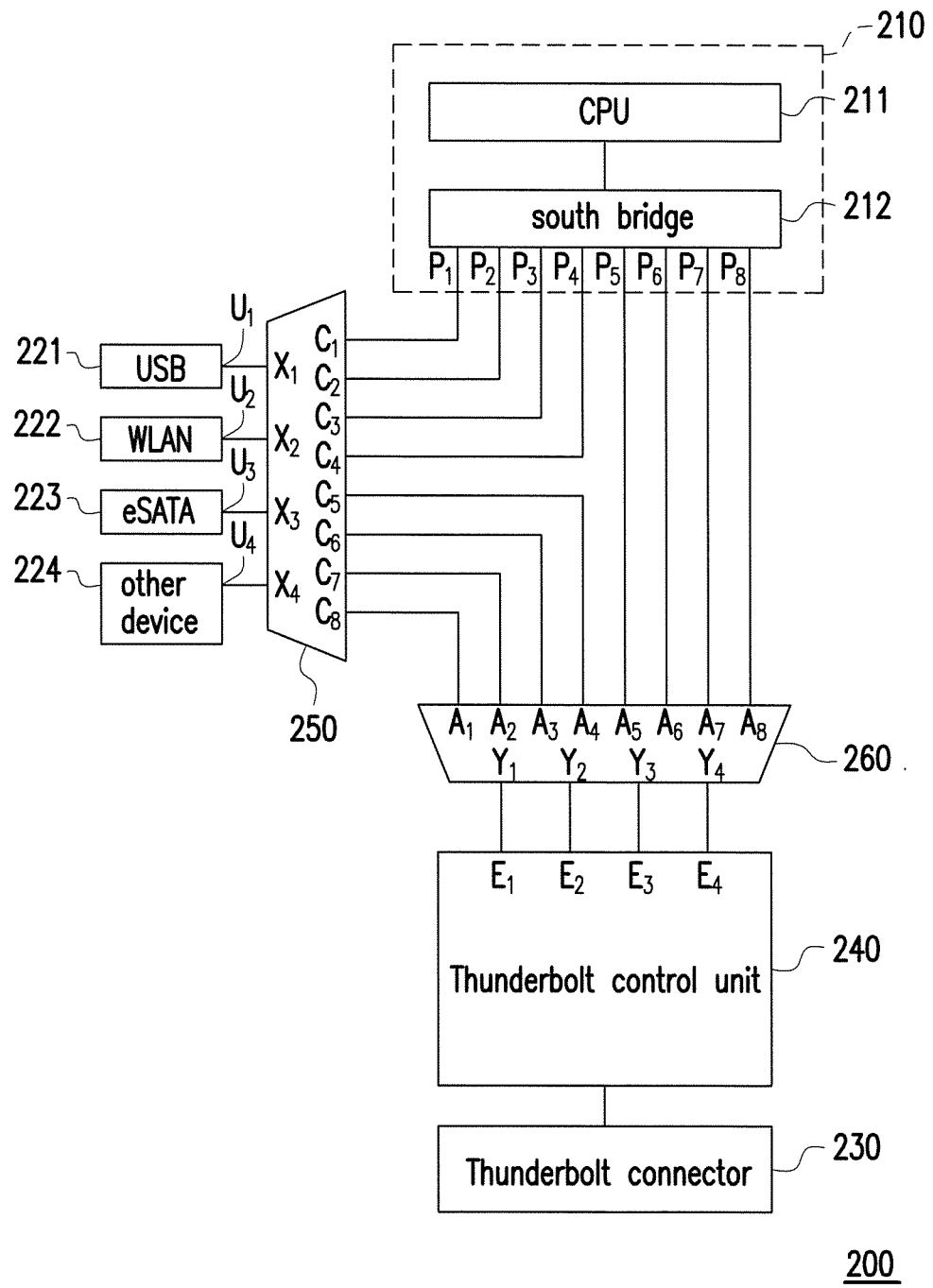
FIG. 2 is a block diagram showing an electronic device in a second embodiment.

FIG. 2 is a block diagram showing an electronic device 200 in a second embodiment. The embodiment shown in FIG. 2 can be analogized reference to descriptions about FIG. 1. As shown in FIG. 2, the electronic device 200 includes a core unit 210, PCIe devices 221, 222, 223, 224, a Thunderbolt connector 230, a Thunderbolt control unit 240, a first switch circuit 250, and a second switch circuit 260. The PCIe devices 221 to 224 may be any device connected to the PCIe bus. For example, as shown in FIG. 2, the PCIe device 221 may be a USB host control chip, the PCIe device 222 may be a WLAN chip, the PCIe device 223 may be an eSATA chip, and the PCIe device 224 may be any other PCIe device, which is not limited herein.

In the embodiment, the core unit 210 includes a central processing unit (CPU) and a south bridge 212. The CPU 211 is coupled to the south bridge 212. The south bridge 212 includes eight PCIe ports (P1 to P8). The first switch circuit 250 includes eight selection terminals (C1 to C8) and four common terminals (X1 to X4). The second switch circuit 260 includes eight selection terminals (A1 to A8) and four common terminals (Y1 to Y4). The PCIe ports P1 to P4 of the south bridge 212 are coupled to the selection terminals C1 to C4 of the switch circuit 250, respectively. The PCIe ports P5 to P8 of the south bridge 212 are coupled to the selection terminal A5 to A8 of the second switch circuit 260, respectively. The selection terminals C5 to C8 of the first switch circuit 250 are coupled to the selection terminals A1 to A4 of the second switch circuit 260, respectively. The common terminal X1 of the switch circuit 250 is coupled to the PCIe port U1 of the PCIe device 221. The common terminal X2 of the first switch circuit 250 is coupled to the PCIe port U2 of the PCIe device 222. The common terminal X3 of the switch circuit 250 is coupled to the PCIe port U3 of the PCIe device 223. The common terminal X4 of the first switch circuit 250 is coupled to the PCIe port U4 of the PCIe device 224. The common terminals Y1 to Y4 of the second switch circuit 250 are coupled to the PCIe ports E1 to E4 of the Thunderbolt control unit 220, respectively.

When the Thunderbolt control unit 240 operates at the host mode, the common terminals X1 to X4 of the first switch circuit 250 are coupled to the selection terminals C1 to C4 of the first switch circuit 250, respectively, and the common terminals Y1 to Y4 of the second switch circuit 260 are coupled to the selection terminals A5 to A8 of the second switch circuit 260, respectively. As a result, the CPU 211 of the core unit 210 can use the PCIe devices 221 to 224 via the south bridge 212 and the first switch circuit 250. The CPU 211 of the core unit 210 is coupled to the Thunderbolt control unit 240 via the south bridge 212 and the second switch circuit 260. Consequently, the CPU 211 can use external Thunderbolt devices (such as an external hard disk drive, a display, a network) connected to the Thunderbolt port 230 via the Thunderbolt control unit 240 in the host mode.

When the Thunderbolt control unit 240 operates at the end-point device mode, the core unit 210 may be disabled. In another embodiment, when the Thunderbolt control unit 240 operates at the end-point device mode, the core unit 210 also may be enabled (or at a normal mode). When the Thunderbolt control unit 240 operates at the end-point device mode, the common terminals X1 to X4 of the first switch circuit 250 are coupled to the selection terminals C5 to C8 of the first switch circuit 250 respectively, and the common terminals Y1 to Y4 of the second switch circuit 260 are coupled to the selection terminals A1 to A4 of the second switch circuit 260, respectively. The core unit 210 is not coupled to the PCIe devices 221 to 224 and the Thunderbolt control unit 240, and the PCIe devices 221 to 224 are coupled to the Thunderbolt control unit 240, respectively. Consequently, the external Thunderbolt host (such as a notebook) can use the PCIe devices 221 to 224 via the Thunderbolt connector 230, the Thunderbolt control unit 240, the second switch circuit 260 and the first switch circuit 250.

Figure 3:
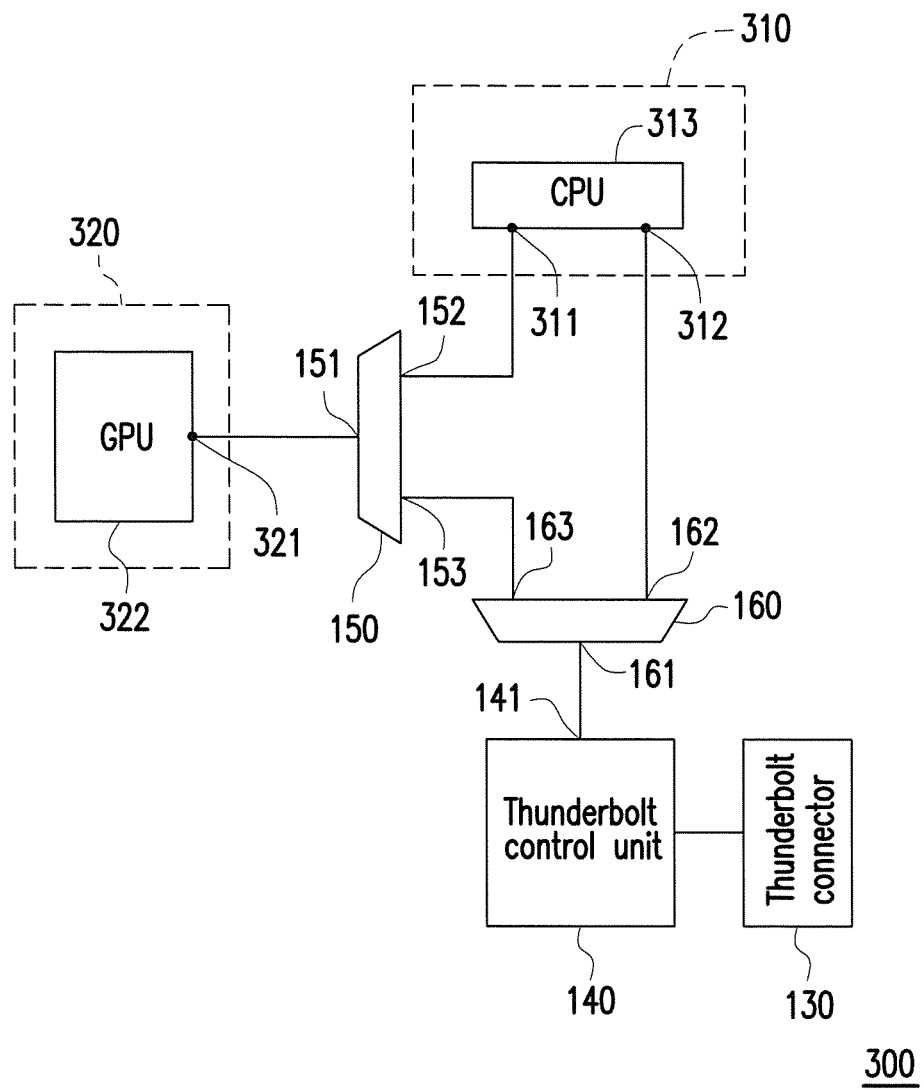
FIG. 3 is a block diagram showing an electronic device in a third embodiment.

FIG. 3 is a block diagram showing an electronic device 300 in a third embodiment. The embodiment shown in FIG. 3 can be analogized reference to descriptions about FIG. 1 and FIG. 2. The electronic device 300 is similar to the electronic device 100, the differences between them are that the core unit 310 of the electronic device 300 includes a CPU 313 and the PCIe device 320 includes a graphics processing unit (GPU) 322. The PCIe port 311 of the CPU 313 is coupled to the selection terminal 152 of the first switch circuit 150. The CPU 313 is coupled to the selection terminal 162 of the second switch circuit 160 via the PCIe port 312. The GPU 322 is coupled to the common terminal 151 of the first circuit 150 via the PCIe port 321. The selection terminal 153 of the first switch circuit 150 is coupled to the selection terminal 162 of the second switch circuit 160.

When the Thunderbolt control unit 140 operates at the host mode, the GPU 322 and the Thunderbolt control unit 140 are coupled to the CPU 313 via the first switch circuit 150 and the second switch circuit 160, respectively. The CPU 313 can use the GPU 322 via the first switch circuit 150, which can accelerate the image processing speed and reduce the burden of the CPU 313. The CPU 313 can also use the external end-point devices (such as an external hard disk drive, a display, a network) connected to the Thunderbolt port 130 via the second switch circuit 160 and the Thunderbolt control unit 140.

When the Thunderbolt control unit 140 operates at the end-point device mode, the CPU 313 is disabled (such as in the S3 mode, S4 mode, S5 mode). In one embodiment, when the Thunderbolt control unit 140 operates at the end-point device mode, the CPU mode 313 can also be enabled (or in a normal mode). When the Thunderbolt control unit 140 operates at the end-point device mode, the GPU 322 is coupled to the Thunderbolt control unit 140 via the first switch circuit 150 and the second switch circuit 160. The CPU 313 is not coupled to the GPU 322 and the Thunderbolt control unit 140. The external Thunderbolt host (such as a note book) can use the GPU 322 to process images via the Thunderbolt connector 130 and the Thunderbolt control unit 140.

Figure 4:
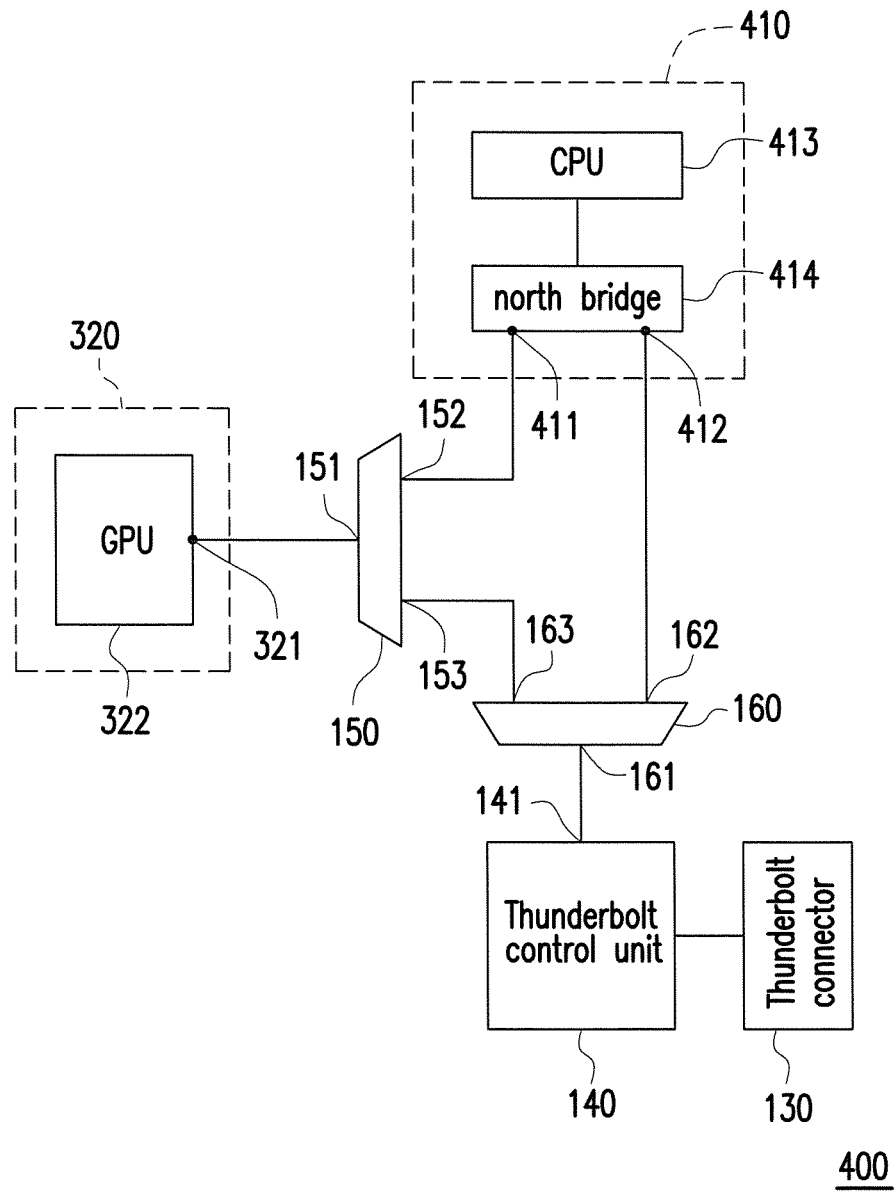
FIG. 4 is a block diagram showing an electronic device in a fourth embodiment.

FIG. 4 is a block diagram showing an electronic device 400 in a fourth embodiment. The embodiment shown in FIG. 3 can be analogized reference to descriptions of FIG. 1, FIG. 2 and FIG. 3. The electronic device 400 is similar to the electronic device 300, the differences between them is that the core unit 410 includes a north bridge 414 except for a CPU 413. The north bridge 414 is coupled to the CPU 413. The north bridge 414 is coupled to the selection terminal 152 of the first switch circuit 150 via the PCIe port 411. The north bridge 414 is coupled to the selection terminal 162 of the second switch circuit 160 via the PCIe port 412. The GPU 322 is coupled to the common terminal 151 of the first switch circuit via the PCIe port 321. The selection port 153 of the switch circuit 150 is coupled to the selection terminal 163 of the second switch circuit 160.

When the Thunderbolt control unit 140 operates at the host mode, the GPU 322 and the Thunderbolt control unit 140 are coupled to the PCIe ports 411 and 412 of the north bridge 414 respectively. The CPU 413 can use the GPU 322 via the north bridge 414 and the first switch circuit 150, which can accelerate the image processing speed and reduce the burden of the CPU 413. The CPU 413 can use the external end-point devices (such as an external hard disk drive, a display, a network) connected to the Thunderbolt port 130 via the second switch circuit 160 and the Thunderbolt control unit 140.

When the Thunderbolt control unit 140 operates at the end-point device mode, the north bridge 414 is disabled. In one embodiment, when the Thunderbolt control unit 140 operates at the end-point device mode, the CPU mode 313 can also be enabled (or in a normal mode). When the Thunderbolt control unit 140 operates at the end-point device mode, the north bridge 414 is not coupled to the GPU 322 and the Thunderbolt control unit 140, and the GPU 322 is coupled to the Thunderbolt control unit 140. The external Thunderbolt host (such as note book) can use the GPU 322 to process images via the Thunderbolt port 130 and the Thunderbolt control unit 140.

Figure 5:
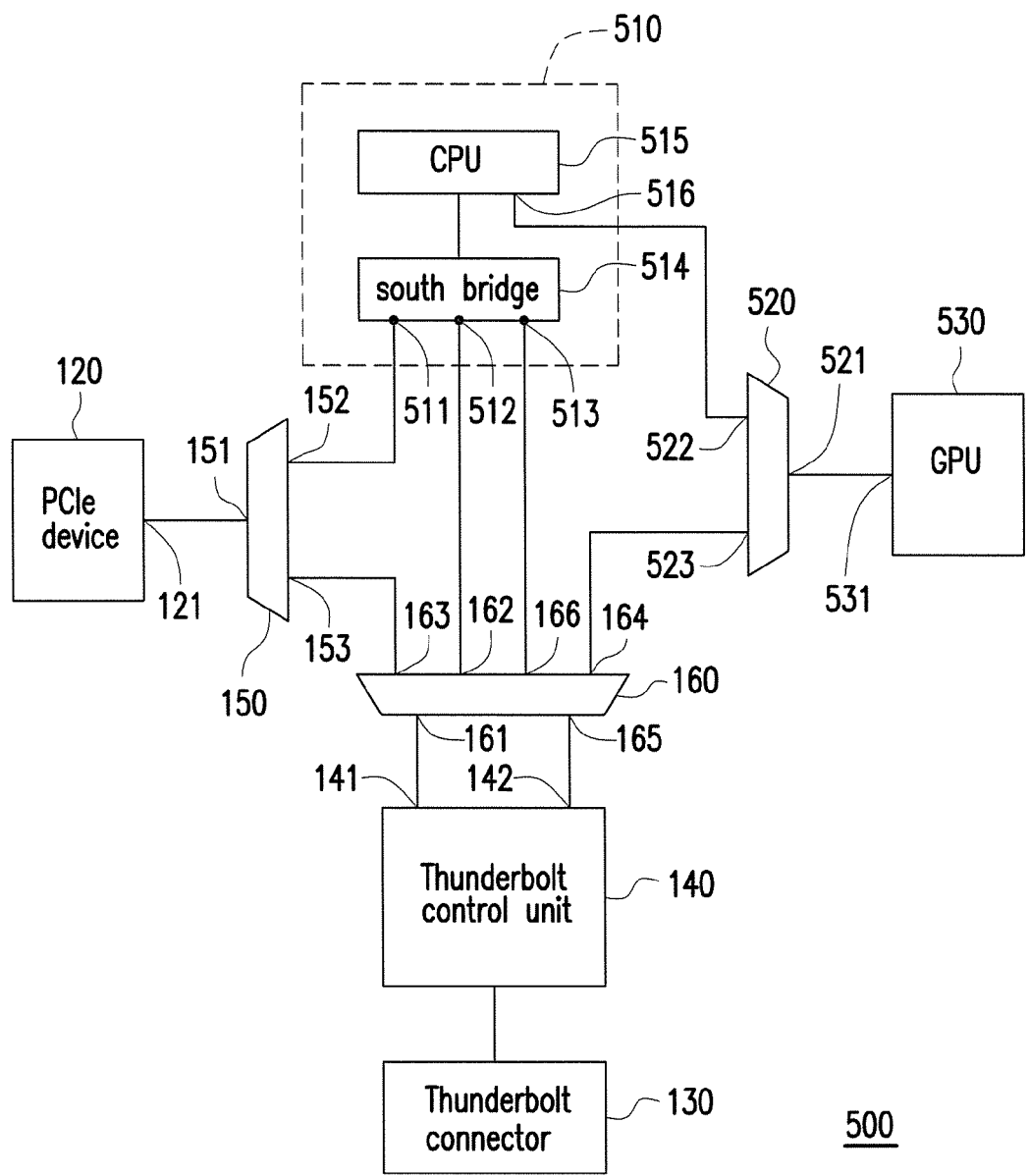
FIG. 5 is a block diagram showing an electronic device in a fifth embodiment.

FIG. 5 is a block diagram showing an electronic device 500 in a fifth embodiment. The embodiment shown in FIG. 3 can be analogized reference to descriptions about FIG. 1 and FIG. 2. The electronic device 500 includes a core unit 510, a PCIe device 120, a Thunderbolt connector 130, a Thunderbolt control unit 140, a first switch circuit 150, a second switch circuit 160, a third switch circuit 520 and a GPU 530. The core unit 510 includes a south bridge 514 and a CPU 515, and the south bridge 514 is coupled to CPU 515. The PCIe port 511 of the south bridge 514 is coupled to the selection terminal 152 of the first switch circuit 150. The PCIe port 512 of the south bridge 514 is coupled to the selection terminal 162 of the second switch circuit 160. The PCIe port 512 of the south bridge 514 is coupled to selection terminal 166 of the second switch circuit 160. The PCIe port 516 of the CPU 515 is coupled to the selection terminal 522 of the third switch circuit 520. The common terminal 161 of the second switch circuit 160 is coupled to the PCIe port 141 of the Thunderbolt control unit 140. The common terminal 165 of the second switch circuit 160 is coupled to the PCIe port 142 of the Thunderbolt control unit 140. The selection terminal 523 of the third switch circuit 520 is coupled to the selection terminal 164 of the second switch circuit 160. The common terminal 521 of the third switch circuit 520 is coupled to the PCIe port 531 of the GPU 530.

When the Thunderbolt control unit 140 operates at the host mode. The common terminal 151 of the first switch circuit 150 is coupled to the selection terminal 152 of the first switch circuit 150. The common terminal 161 of the second switch circuit 160 is coupled to the selection terminal 162 of the second switch circuit 160. The common terminal 165 of the second switch circuit 160 is coupled to the selection terminal 166 of the second switch circuit 160. The common terminal 521 of the third switch circuit 520 is coupled to the selection 522 of the third switch circuit 520. The CPU 515 is coupled to the PCIe device 120 via the south bridge 514. The PCIe device 120 can be a USB control chip, a WLAN chip, an eSATA chip and other PCIe devices. The CPU 515 is coupled to the GPU 530 via the PCIe port 516. The CPU 515 can use the PCIe device 120 via the south bridge 514, which can improve the image processing ability and reduce the burden of the CPU 515 by using the GPU 530. The CPU 515 also may use external end-point devices connected to the Thunderbolt port 130 via the south bridge 514, the second switch circuit 160 and the Thunderbolt control unit 140.

When the Thunderbolt control unit 140 operates at the end-point device mode, the CPU 515 and the south bridge chip 514 is disabled. In one embodiment, when the Thunderbolt control unit 140 operates at the end-point device mode, the CPU 515 and the south bridge chip 514 may also be enabled (or normal mode). When the Thunderbolt control unit 140 operates at the end-point device mode, the common terminal 151 of the first switch circuit 150 is coupled to the selection terminal 153 of the first switch circuit 150. The common terminal 161 of the second switch circuit 160 is coupled to the selection terminal 163 of the second switch circuit 160. The common terminal 165 of the second switch circuit 160 is coupled to the selection terminal 164 of the second switch circuit 160. The common terminal 521 of the third switch circuit 520 is coupled to the selection terminal 523 of the third switch circuit 520. The Thunderbolt control unit 140 is coupled to the PCIe device 120 via the first switch circuit 150 and the second switch circuit 160, and the Thunderbolt control unit 140 is coupled to the GPU 530 via the second switch circuit 160 and the third switch circuit 520. The external Thunderbolt host (such as note book) can use the PCIe device 120 and the GPU 530 via the Thunderbolt port 130 and the Thunderbolt control unit 140, and the PCIe device 120 may be a low speed transmission device such as a USB.

Figure 6A:
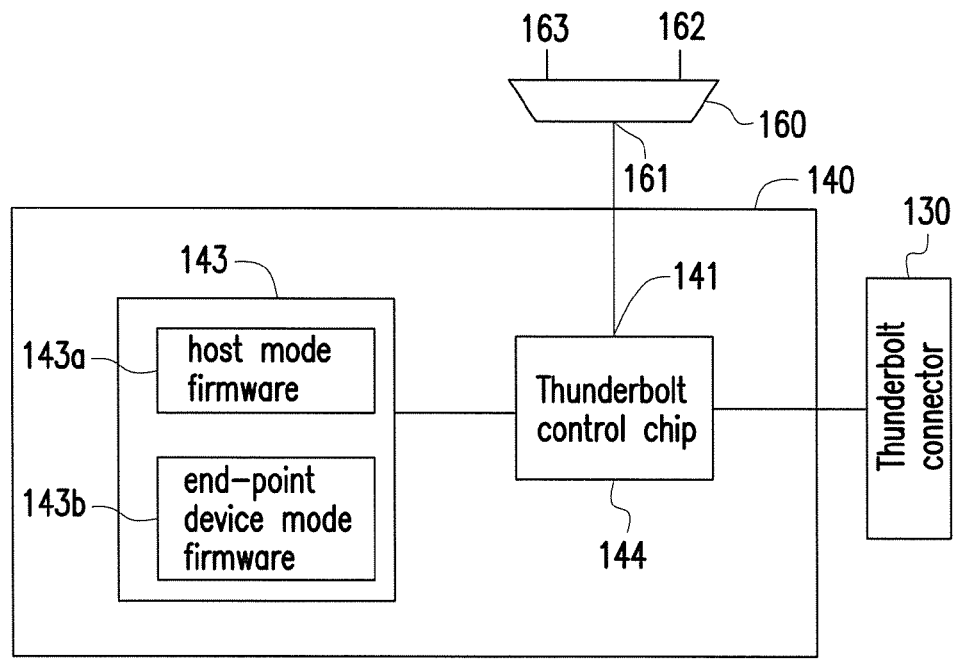
FIG. 6A and FIG. 6B are block diagrams showing the Thunderbolt control unit in FIG. 1.

FIG. 6A is a block diagram showing the Thunderbolt control unit 140 in FIG. 1. The Thunderbolt control unit 240 in FIG. 2 and the Thunderbolt control units 140 in FIG. 3 to FIG. 5 can be analogized reference to descriptions about FIG. 6A. As shown in FIG. 6A, the Thunderbolt control unit 140 includes a memory 143 and a Thunderbolt control chip 144. The memory 143 may be any kind of memory, such as a non-volatile memory (NVM), a read only memory (ROM), a flash memory, an electrically erasable programmable read-only memory (EEPROM), a programmable read-only memory (PROM), an electrically programmable read-only-memory (EPROM) or any other memory. In one embodiment, the memory 143 may be a Volatile memory such as a random-access memory (RAM). The volatile memory may be supplied via a battery to store data therein.

The memory 143 includes a host mode firmware 143a and an end-point device mode firmware 143b. The Thunderbolt control unit 144 is coupled to the common terminal 161 of the second switch circuit 160 via the PCIe port 141. The Thunderbolt control chip 144 is coupled to the memory 143 and the Thunderbolt connector 130.

When the Thunderbolt control chip executes the host mode firmware 143a, the Thunderbolt control unit 140 operates at the host mode. When the Thunderbolt control chip 144 executes the end-point mode firmware 143b, the Thunderbolt control unit 140 is at the end-point mode. To switch the Thunderbolt control unit 140 from the host mode to the end-point device mode, it should reset the Thunderbolt control chip 144, and then the Thunderbolt control chip 144 executes the end-point device mode firmware 143b. Similarly, to switch the Thunderbolt control unit 140 from the end-point device mode to the host mode, it should reset the Thunderbolt control chip 144 first, and then the Thunderbolt control chip 144 executes the host mode firmware 143a.

Figure 6B:
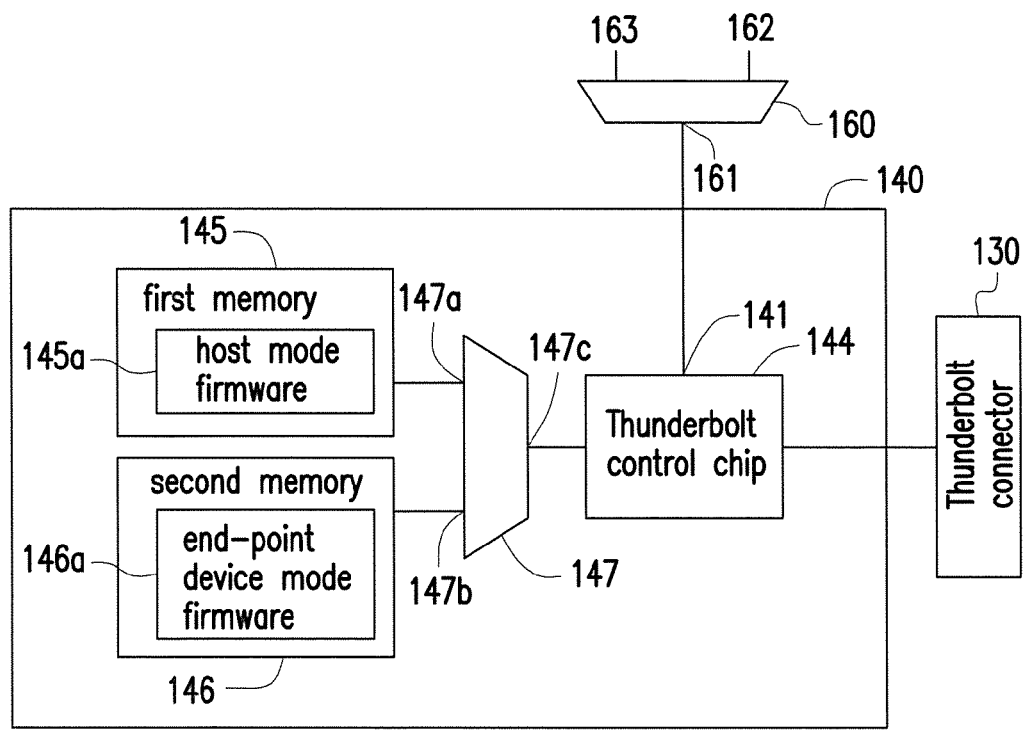

FIG. 6B is a block diagram showing a Thunderbolt control unit 140 in FIG. 1. The Thunderbolt control unit 240 of FIG. 2 and the Thunderbolt control unit 140 of FIG. 3 to FIG. 5 can be analogized reference to descriptions of FIG. 6B. As shown in FIG. 6B, the Thunderbolt control unit 140 includes a Thunderbolt control chip 144, a first memory 145, a second memory 146 and a switch 147. The first memory 145 and the second memory 146 may be any kind of memory such as a NVM and a volatile memory. For example, the first memory 145 and the second memory 146 may be a ROM, a FLASH memory, an EEPROM, a PROM, an EPROM or any other memory. When the first memory 145 and the second memory 146 are volatile memories, they may be supplied via a battery to store the data therein.

The Thunderbolt control chip 144 is coupled to the common terminal 161 of the second switch circuit 160 via the PCIe port 141. The Thunderbolt control chip 144 also may be coupled to the Thunderbolt connector 130. The first memory 145 includes a host mode firmware 145a. The second memory 146 includes an end-point device mode firmware 146a. A selection terminal 147a of the switch 147 is coupled to the first memory 145, a selection terminal 147b of the switch 147 is coupled to the second memory 146, and a common terminal 147c of the switch 147 is coupled to the Thunderbolt control chip 144.

When the common terminal 147c of the switch 147 is coupled to the selection terminal 147a of the switch 147, the Thunderbolt control chip 144 is coupled to the first memory 145. Consequently, the Thunderbolt control chip 144 reads and executes the Host mode firmware 145a via the switch 147. At the moment, the Thunderbolt control unit 140 operates at the Host mode.

When the common terminal 147c of the switch 147 is coupled to the selection terminal 147b of the switch 147, the Thunderbolt control chip 144 is coupled to the second memory 146. After resetting the Thunderbolt control chip 144, the Thunderbolt control chip 144 reads and executes the end-point device mode firmware 146a in the second memory 146. At the moment, the Thunderbolt control unit 140 operates at the end-point device mode.

The electronic device in one embodiment includes two Thunderbolt control units.

Figure 7:
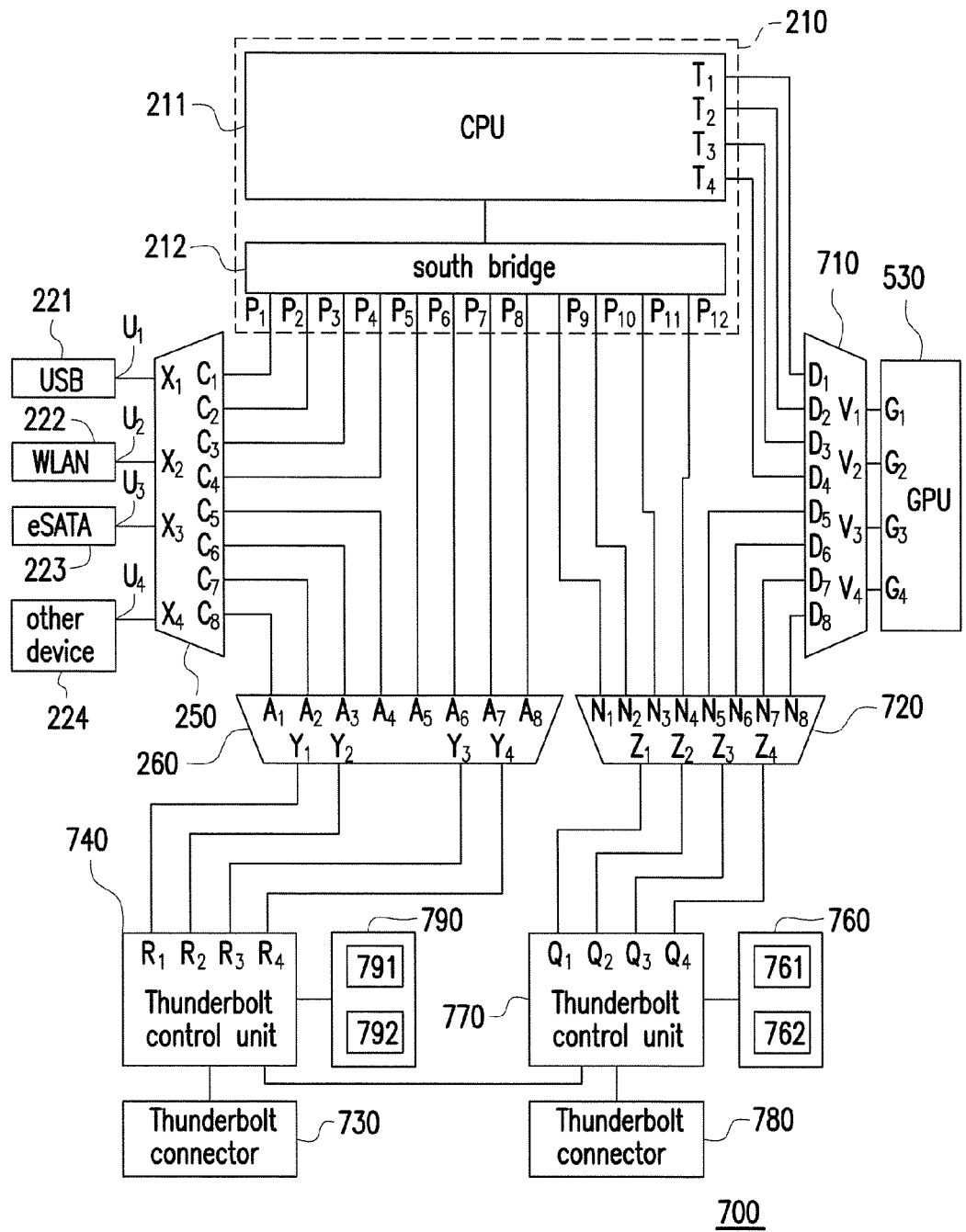
FIG. 7 is a block diagram showing an electronic device in a sixth embodiment.

FIG. 7 is a block diagram showing an electronic device 700 in a sixth embodiment, and it can be analogized reference to descriptions about FIG. 1 to FIG. 5, FIG. 6A, and FIG. 6B. The electronic device 700 in FIG. 7 is similar to the electronic device 200 in FIG. 2, the differences between them are that the electronic device 700 further includes a GPU 530, a third switch circuit 710, and a fourth switch circuit 720, the Thunderbolt control unit 240 is replaced by two Thunderbolt control units 740 and 770, and the memory 790, and the Thunderbolt connector 230 is replaced by two Thunderbolt connectors 730 and 780. The CPU 211 includes four PCIe ports T1 to T4, and the south bridge 212 includes twelve PCIe ports P1 to P12. The Thunderbolt control unit 740 includes PCIe ports R1 to R8, and the Thunderbolt control unit 770 includes PCIe ports Q1 to Q8. The third switch circuit 710 includes selection terminals D1 to D8 and common terminals V1 to V4, the fourth switch circuit 720 includes selection terminals N1 to N8 and common terminals Z1 to Z4, and the GPU 530 includes four PCIe ports G1 to G4.

The selection terminals D1 to D4 of the third switch circuit 710 are coupled to the PCIe ports T1 to T4 of the CPU 211, respectively. The selection terminals D5 to D8 of the third circuit 710 are coupled to the selection terminals N5 to N8 of the fourth switch circuit 720, respectively. The common terminals V1 to V4 of the third switch circuit 710 are coupled to the PCIe ports G1 to G4 of the GPU 530, respectively. The selection terminals N1 to N4 of the fourth switch circuit 720 are coupled to the PCIe ports P9 to P12 of the south bridge 212, respectively. The common terminals Z1 to Z4 of the fourth switch circuit 720 are coupled to the PCIe ports Q1 to Q4 of the Thunderbolt control unit 770, respectively. The PCIe ports R1 to R4 are coupled to the common terminals Y1 to Y4 of the second switch circuit 260, respectively. The Thunderbolt control unit 740 is coupled to the Thunderbolt control unit 770. The Thunderbolt control unit 740 is coupled to the Thunderbolt control unit 730. The Thunderbolt control unit 770 is coupled to the Thunderbolt connector 780.

The memory 790 may be any kind of memory such as a non-volatile memory or a volatile memory. For example, the memory 143 may be a ROM, a FLASH memory, an EEPROM, a PROM, and an EPROM or any other memory. In one embodiment, the memory 790 is a volatile memory, and it may be supplied via a battery to keep data stored therein. In another embodiment, the memory 790 may be analogized reference to descriptions about the memories 145, 146 and the switch 147 in FIG. 6B.

The embodiment of FIG. 7 may be analogized reference to descriptions about FIG. 2. The Thunderbolt control unit 740 is coupled to the memory 790. The memory 790 includes a host mode firmware 791 and an end-point device mode firmware 792. When the Thunderbolt control unit 740 reads and executes the host mode firmware 791 of the memory 790, the Thunderbolt control unit 740 operates at the host mode. When the Thunderbolt control unit 740 reads and executes the end-point device mode firmware 792 of the memory 790, the Thunderbolt control unit 740 operates at the end-point device mode. The Thunderbolt control unit 770 is coupled to the memory 760. The memory 760 includes a host mode firmware 761 and the end-point device mode firmware 762. The Thunderbolt control unit 770 may operate at the host mode or the end-point device mode dynamically, which is similar to the method for switching modes of the Thunderbolt control unit 740. The implementation of the Thunderbolt control unit 770 and the memory 760 can be referred to descriptions of the Thunderbolt control unit 740 and the memory 790, which is omitted herein.

When the Thunderbolt control units 740 and 770 are in the host mode, the common terminals X1 to X4 of the first switch circuit 250 are coupled to the selection terminals C1 to C4 of the first switch circuit 250, respectively. The common terminals Y1 to Y4 of the second switch circuit 260 are coupled to the selection terminals A5 to A8 of the second switch circuit 260, respectively. The selection terminals D1 to D4 of the third switch circuit 710 are coupled to the common terminals V1 to V4 of the third switch circuit 710, respectively. The selection terminals N1 to N4 of the fourth switch circuit 720 are coupled to the common terminals Z1 to Z4 of the fourth switch circuit 720, respectively. Consequently, the CPU 211 of the core unit 210 can use the PCIe devices 221 to 224 via the south bridge 212 and the first switch circuit 250. The CPU 211 can use the GPU 530 via the third switch circuit 710. The CPU 211 can use external Thunderbolt devices connected to the Thunderbolt control unit 730 via the south bridge 212, second switch circuit 260 and the Thunderbolt control unit 740. The CPU 211 can use external Thunderbolt devices connected to the Thunderbolt control connector 780 via the south bridge 212, the fourth switch circuit 720 and the Thunderbolt control unit 770. The data transmission speed of the electronic device 700 can be accelerated in the host mode. Additionally, since the Thunderbolt control unit 740 is coupled to the Thunderbolt control unit 770, the external Thunderbolt devices coupled to the Thunderbolt connector 730 can exchange data with the external Thunderbolt devices coupled to the Thunderbolt connector 780 via the Thunderbolt control units 740 and 770 to accelerate the data transmission speed.

When the Thunderbolt control units 740 and 770 operate at the end-point device mode, one or both of the CPU 211 and the south bridge 212 are disabled. In one embodiment, when the Thunderbolt control units 740 and 770 operate at the end-point device mode, the CPU 211 and the south bridge 212 also may be enabled (or in a normal mode). When the Thunderbolt control units 740 and 770 operate at the end-point device mode, the common terminals X1 to X4 of the first switch circuit 250 are coupled to the selection terminals C5 to C8 of the first switch circuit 250 respectively, and the common terminals Y1 to Y4 of the second switch circuit 260 are coupled to the selection terminals A1 to A4 of the second switch circuit 260, respectively. The common terminals V1 to V4 of the third switch circuit 710 are coupled to the selection terminals D5 to D8 via the third circuit 710, respectively. The common terminals Z1 to Z4 of the fourth switch circuit 720 are coupled to the selection terminals N5 to N8 of the fourth switch circuit 720, respectively. Consequently, the external Thunderbolt host (such as a notebook) can use the PCIe devices 221 to 224 via the Thunderbolt connector 730, the Thunderbolt control unit 740, the second switch circuit 260 and the first switch circuit 250. The external Thunderbolt host can use the GPU 530 via the Thunderbolt connector 780, the Thunderbolt control unit 770, the fourth switch circuit 720 and the third switch circuit 710. As a result, the external Thunderbolt host in the end-point device mode can be connected to more PCIe devices, and the external devices coupled to the Thunderbolt connectors 730, 780 can exchange data with each other.

Figure 8:
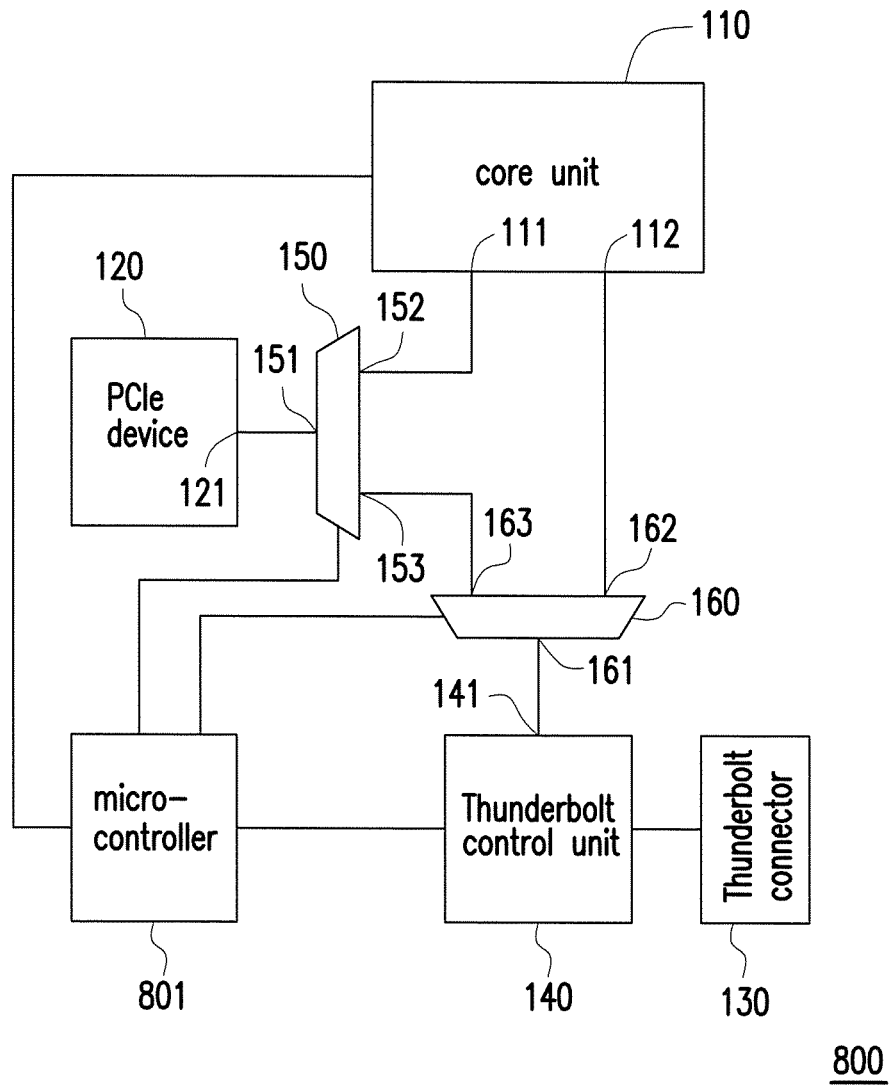
FIG. 8 is a block diagram showing an electronic device in a seventh embodiment.

FIG. 8 is a block diagram showing an electronic device 800 in a seventh embodiment. The electronic device 800 is similar to the electronic device 100, and the difference between them is that electronic device 800 further includes a micro-controller 801. The embodiments of FIG. 1 to FIG. 8 can be analogized reference to related descriptions. As shown in FIG. 8, the micro-controller 801 is coupled to the first circuit 150, the second circuit 160, the core unit 110 and the Thunderbolt control unit 140.

To operate the electronic device 800 at the host mode, a user can give a mode switching command to the micro-controller 801 via the operation interface. The micro-controller 801 controls the Thunderbolt control unit 140, the first switch circuit 150 and the second switch circuit 160 according to the switching commands. With the controlling of the micro-controller 801, the first switch circuit 150 switches the selection terminal 152 to be coupled to the common terminal 151, and the second switch circuit 160 switches the selection terminal 162 to be coupled to the common terminal 161. Furthermore, the micro-controller 801 controls the Thunderbolt control unit 140 to switch at the host mode.

To operate the electronic device 800 at the end-point device mode, the user can give a mode switching command to the micro-controller 801 via the operation interface. The micro-controller 801 can control the Thunderbolt control unit 140, the first switch circuit 150 and the second switch 160 according to the switching command. With the control of the micro-controller 801, the selection terminal 153 of the first switch circuit 150 is coupled to the common terminal 151, and the selection terminal 163 of the second switch circuit 160 is coupled to the common terminal 161. The micro-controller 801 controls the Thunderbolt control unit to switch at the end-point device mode. The micro-controller 801 may disable the core unit 110 (such as in the S3 mode, S4 mode, S5 mode or other disable modes). In one embodiment, when the Thunderbolt control unit 140 operates at the end-point device mode, the micro-controller 801 controls the core unit 110 to operate at the enable mode.

According to the descriptions of the embodiment, persons having ordinary skills in the art can apply the embodiment to embodiments of FIG. 1 to FIG. 7. For example, the micro-controller 801 also may be used in embodiments shown in FIG. 2, FIG. 3, FIG. 4, FIG. 5, and FIG. 7.

Figure 9:
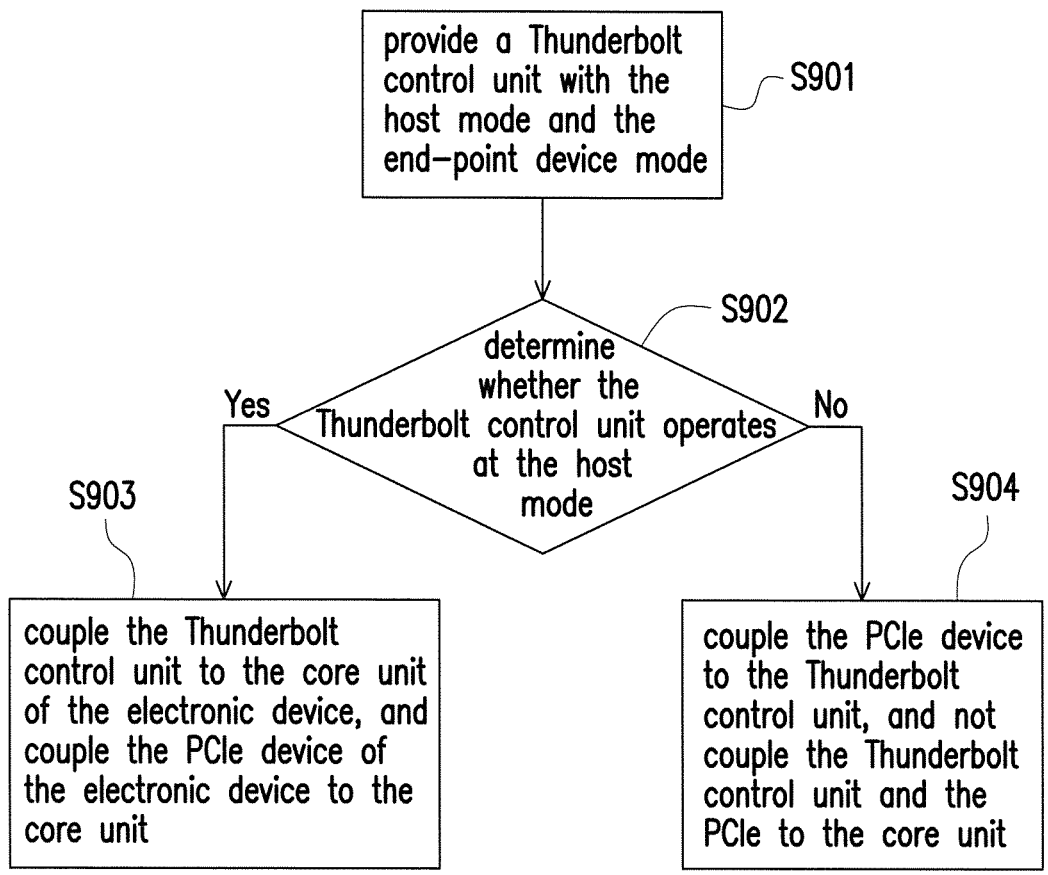
FIG. 9 is a flowchart showing a method for switching modes of a Thunderbolt connector of an electronic device in a first embodiment.

FIG. 9 is a flowchart showing the process of the method for switching modes of a Thunderbolt connector of the electronic device 100 in a first embodiment. As shown in FIG. 1 and FIG. 9, in step S901, providing a Thunderbolt control unit 140 with the host mode and the end-point device mode. In step S902, determining whether the Thunderbolt control unit 140 operates at the host mode. If the Thunderbolt control unit 140 operates at the host mode, step S903 is executed, otherwise, step S904 is executed.

In step S903, when the Thunderbolt control unit 140 operates at the host mode, the Thunderbolt control unit 140 is coupled to the core unit 110 of the electronic device 100, and the PCIe device 120 of the electronic device 100 is coupled to the core unit 110. As a result, the core unit 110 can use the PCIe device 120 and external end-point devices connected to the Thunderbolt connector 130.

In step S904, when the Thunderbolt control unit 140 operates at the end-point device mode, the Thunderbolt control unit 140 is not coupled to the core unit 110, and the PCIe device 120 is coupled to the Thunderbolt control unit 140 but not the core unit 110. Consequently, the external Thunderbolt host (such as a notebook) can use the PCIe device 120 via the Thunderbolt connector 130 and the Thunderbolt control unit 140.

Figure 10:
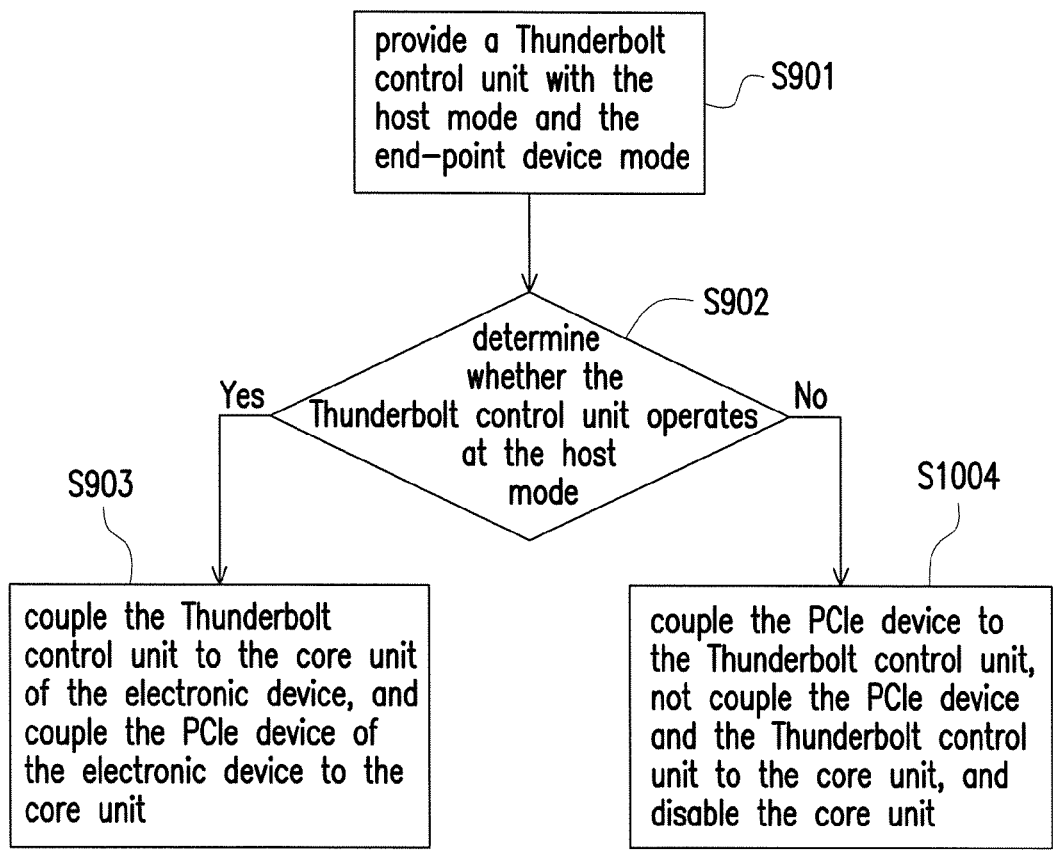
FIG. 10 is a flowchart showing a method for switching modes of a Thunderbolt connector of an electronic device in a second embodiment.

FIG. 10 is a flowchart showing the process 1000 of the method for switching modes of a Thunderbolt connector of an electronic device in a second embodiment. Steps of the flowchart 1000 are similar to steps of the process 900, and the difference between them is that the step S904 is replaced by the step S1004. In contrast with step S904, the step S1004 further includes a step of disabling the core unit 110 when the Thunderbolt control unit 140 operates at the end-point device mode.

Figure 11:
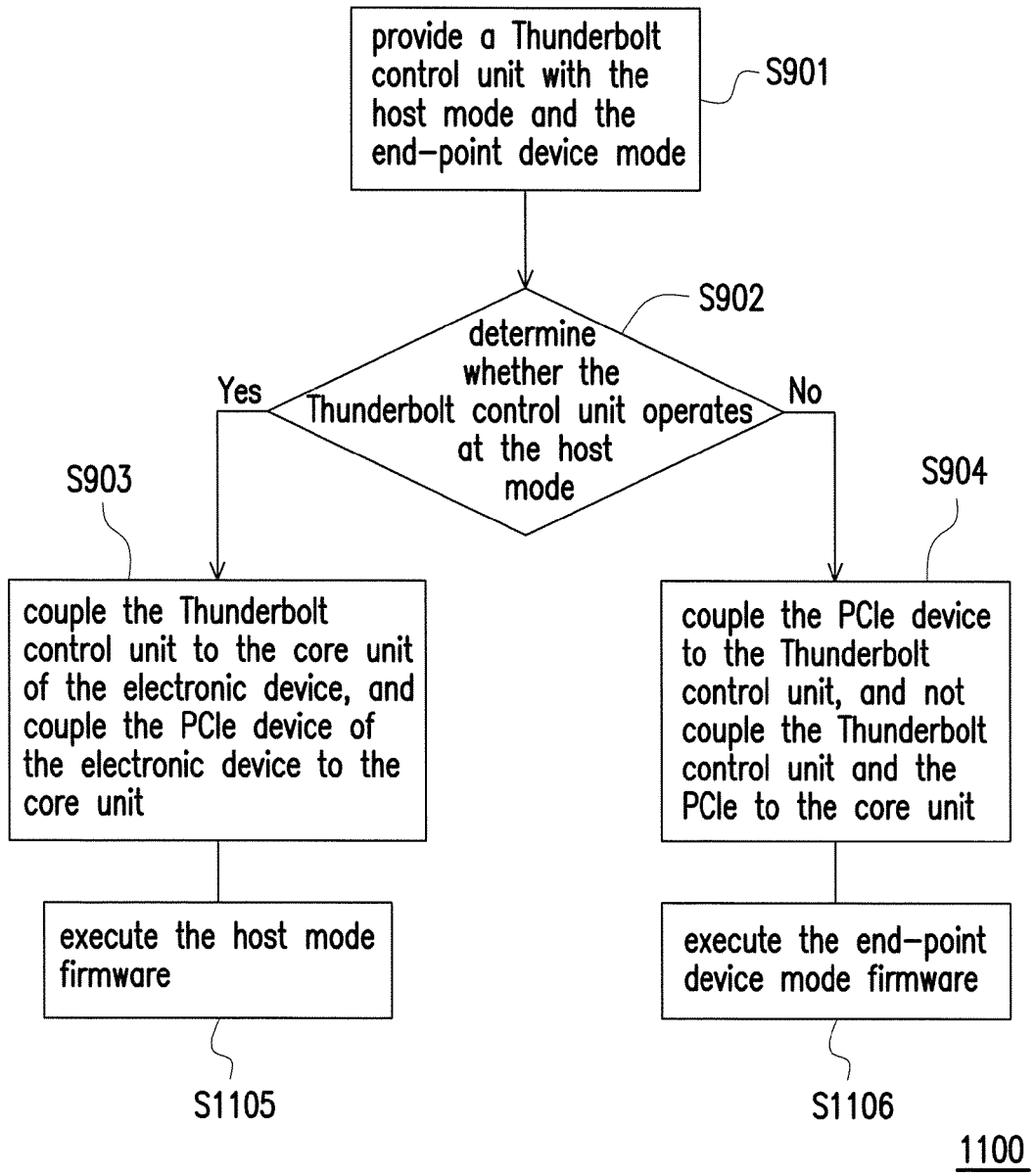
FIG. 11 is a flowchart showing a method for switching modes of a Thunderbolt connector of an electronic device in a third embodiment.

FIG. 11 is a flowchart showing the process 1100 of the method for switching modes of a Thunderbolt of an electronic device in a third embodiment. Steps of the process 1100 are similar to steps of the process 900, the difference between them is that step S1105 is further executed after step S903, and step S1106 is further executed after step S904. In step S1105, the Thunderbolt control unit 140 executes the host mode firmware of the Thunderbolt control unit 140. In step S1106, the Thunderbolt control unit 140 executes the end-point device mode firmware of the Thunderbolt control unit 140. In another embodiment, step S904 can be replaced by step S1004.

Figure 12:
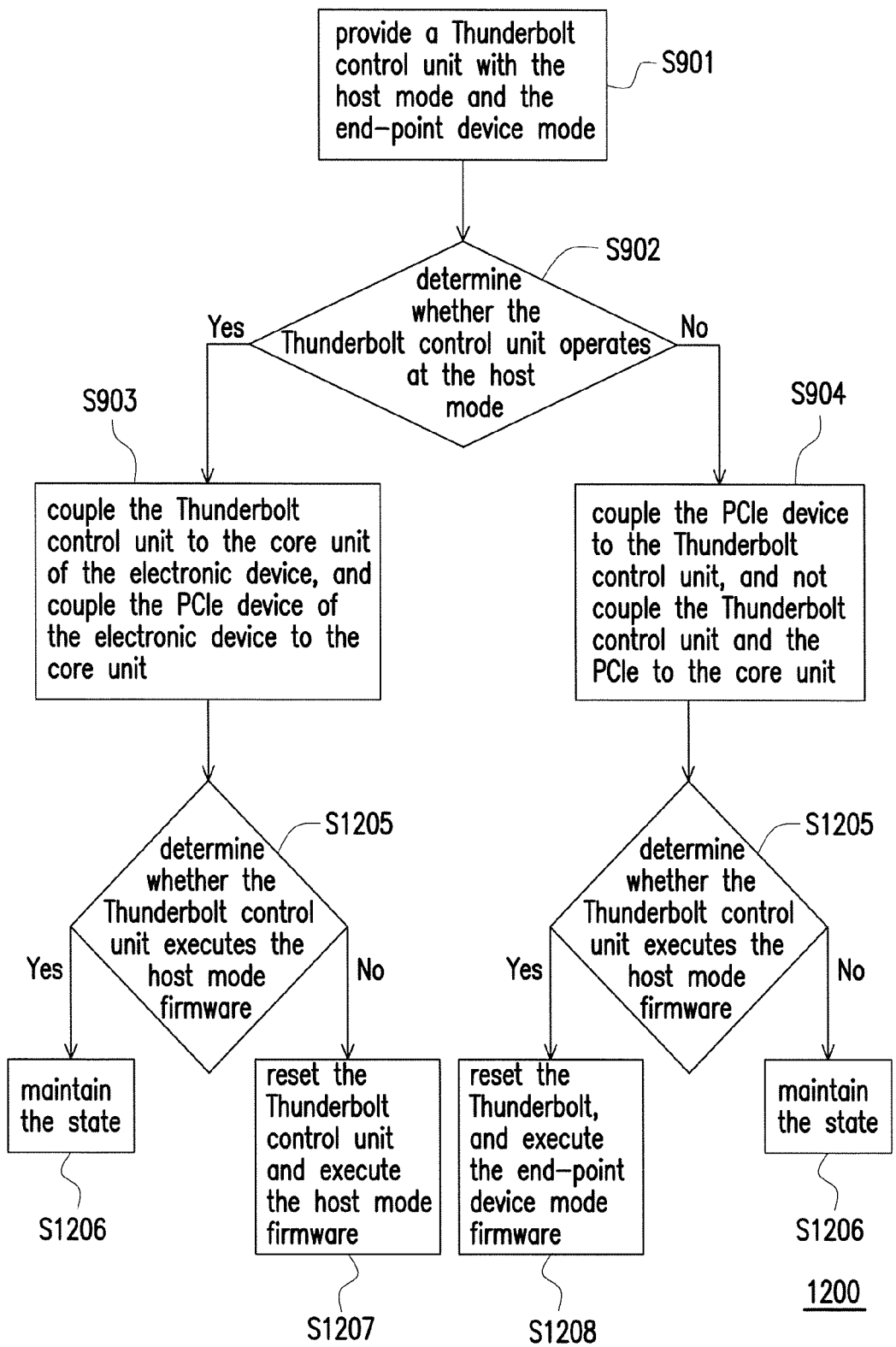
FIG. 12 is a flowchart showing the method for switching modes of a Thunderbolt connector of an electronic device in a fourth embodiment.

FIG. 12 is a flowchart showing the process 1200 of the method for switching modes of a Thunderbolt connector of an electronic device in a fourth embodiment. Steps S901 to S904 in process 1200 is same to those in FIG. 9. In the process 1200, after step S903, step S1205 is executed to determine whether the Thunderbolt control unit 140 operates at the host mode. That is, whether the Thunderbolt control unit 140 executes the host mode firmware is determined. If the determining result is "YES", step S1206 is execute to maintain the state, and the Thunderbolt control unit 140 continues to execute the host mode firmware. If the determining result is "NO", step S1207 is executed, the Thunderbolt control unit 140 is reset and the Thunderbolt control unit 140 executes the host mode firmware.

After step S904, step S1205 is executed to determine whether the Thunderbolt control unit 140 executes the host mode firmware. If the determining result is "YES", step S1208 is executed to reset the Thunderbolt 140, and the Thunderbolt control unit 140 executes the end-point device mode firmware. If the determining result is "NO", the Thunderbolt control unit 140 continues executing the end-point device mode firmware.

Consequently, the electronic device and the method for switching modes of a Thunderbolt connector can allow the Thunderbolt control unit 140 to operate at the host mode or the end-point device mode by switching the connection among the selection terminals and the common terminals of the first switch circuit and the second switch circuit. Unlike conventional Thunderbolt controllers, the Thunderbolt control unit of the electronic device in the embodiments can be considered as a host to use external end-point devices, and it also can be considered as an end-point device to use the PCIe devices coupled to the Thunderbolt control unit.

Although the disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An electronic device, comprising:
 a core unit including a first Peripheral Component Interconnect Express (PCIe) port and a second PCIe port;
 a peripheral device including a PCIe port;
 a Thunderbolt connector;
 a Thunderbolt control unit coupled to the Thunderbolt connector, wherein the Thunderbolt control unit includes a host mode and an end-point device mode;
 a first switch circuit, wherein, a first common terminal of the first switch circuit is coupled to the PCIe port of the peripheral device, and a first selection terminal of the first switch circuit is coupled to the first PCIe port of the core unit; and
 a second switch circuit, wherein a common terminal is coupled to a first PCIe port of the Thunderbolt control unit, a first selection terminal of the second switch circuit is coupled to the second PCIe port of the core unit, and a second selection terminal of the second switch circuit is coupled to a second selection terminal of the first switch circuit,
 wherein the Thunderbolt control unit selectively operates at the host mode or the end-point device mode according to a user command or whether the core unit is enabled or not,
 when the Thunderbolt control unit operates at the host mode, the first common terminal of the first switch circuit is coupled to the first selection terminal of the first switch circuit, the first common terminal of the second switch circuit is coupled to the first selection terminal of the second switch circuit; and when the Thunderbolt control unit operates at the end-point device mode, the first common terminal of the first switch circuit is coupled to the second selection terminal of the first switch circuit, the first common terminal of the second switch circuit is coupled to the second selection terminal of the second switch circuit.

2. The electronic device according to claim 1, wherein the core unit includes a central processing unit (CPU), the peripheral device includes a graphic processing unit (GPU); when the Thunderbolt control unit operate at the host mode, the GPU is coupled to the CPU via the first switch circuit, the Thunderbolt control unit is coupled to the CPU via the second switch circuit; and when the Thunderbolt control unit operate at the end-point device mode, the graphic processing unit is coupled to the Thunderbolt control unit via the first switch circuit and second switch circuit.

3. The electronic device according to claim 1, wherein the core unit includes a north bridge, and the peripheral device includes a GPU; when the Thunderbolt control unit operates at the host mode, the GPU is coupled to the north bridge via the first switch circuit, the Thunderbolt control unit is coupled to the north bridge via the second switch circuit; and when the Thunderbolt control unit operates at the end-point device mode, the GPU is coupled to the Thunderbolt control unit via the first switch circuit and second switch circuit.

4. The electronic device according to claim 1, wherein, the core unit includes a south bridge, the first selection terminal of the first switch circuit is coupled to the south bridge; when the Thunderbolt control unit operates at the host mode, the peripheral device is coupled to the south bridge via the first switch circuit, and the Thunderbolt control unit is coupled to the south bridge via the second switch circuit; when the Thunderbolt control unit operates at the end-point device mode, the peripheral device is coupled to the Thunderbolt control unit via the first switch circuit and the second switch circuit.

5. The electronic device according to claim 4, wherein the core unit further includes a CPU, and the electronic device further includes:
 a GPU including a PCIe port; and
 a third switch circuit, wherein a common terminal of the third switch circuit is coupled to the PCIe port of the GPU, a first selection terminal of the third switch circuit is coupled to the CPU, a second selection terminal of the third switch circuit is coupled to a third selection terminal of the second switch circuit;
 wherein a second common terminal of the second switch circuit is coupled to a second PCIe port of the Thunderbolt control unit; when the Thunderbolt control unit operates at the host mode, the GPU is coupled to the CPU via the third switch circuit; and when the Thunderbolt control unit operates at the end-point device mode, the GPU is coupled to the Thunderbolt control unit via the third switch circuit and the second switch circuit.

6. The electronic device according to claim 1, wherein the Thunderbolt control unit includes:
 a memory storing a host mode firmware and an end-point device mode firmware; and
 a Thunderbolt control chip is coupled to the first common terminal of the second switch circuit and the memory;
 wherein when the Thunderbolt control chip executes the host mode firmware, the Thunderbolt control unit operates at the host mode; and when the Thunderbolt control chip executes the end-point device mode firmware, the Thunderbolt control unit operates at the end-point mode.

7. The electronic device according to claim 6, wherein the host mode firmware is executed after the Thunderbolt control chip is reset to switch from the end-point device mode to the host mode; and the end-point device mode firmware is executed after the Thunderbolt control chip is reset to switch from the host mode to the end-point device mode.

8. The electronic device according to claim 1, wherein the Thunderbolt control unit includes:
 a Thunderbolt control chip coupled to the first common terminal of the second switch circuit;
 a first memory storing a host mode firmware;
 a second memory storing an end-point device mode firmware; and
 a switch, wherein a selection terminal of the switch is coupled to the first memory, a second selection terminal of the switch is coupled to the second memory, and a common terminal is coupled to the Thunderbolt control chip;
 when the Thunderbolt control chip reads and executes the host mode firmware via the switch, the Thunderbolt control unit operates at the host mode; and when the Thunderbolt control chip reads and executes the end-point device mode firmware, the Thunderbolt control unit operates at the end-point device mode.

9. The electronic device according to claim 1, wherein the peripheral device is a Universal Serial Bus (USB) chip, a wireless local area network (WLAN) chip, or an External Serial Advanced Technology Attachment (eSATA) chip.

10. A method for switching modes of a Thunderbolt connector of an electronic device, comprising:
 providing a Thunderbolt control unit, wherein the Thunderbolt control unit includes a host mode and an end-point device mode, the electronic device further includes a core unit including a first PCIe port and a second PCIe port, a peripheral device including a PCIe port, a first switch circuit and a second switch circuit, a first common terminal of the first switch circuit is coupled to the PCIe port of the peripheral device, a first selection terminal of the first switch circuit is coupled to the first PCIe port of the core unit, a first common terminal of the second switch circuit is coupled to a first PCIe port of the Thunderbolt control unit, a first selection terminal of the second switch circuit is coupled to the second PCIe port of the core unit, and a second selection terminal of the second switch circuit is coupled to a second selection terminal of the first switch circuit;
 determining whether the Thunderbolt control unit is operated at the host mode or the end-point device mode according to a user command or whether the core unit is enabled or not;
 coupling the Thunderbolt control unit to the core unit of the electronic device and coupling the peripheral device to the core unit when the Thunderbolt control unit operates at the host mode by coupling the first common terminal of the first switch circuit to the first selection terminal of the first switch circuit, and coupling the first common terminal of the second switch circuit to the first selection terminal of the second switch circuit; and
 coupling the peripheral device to the Thunderbolt control unit when the Thunderbolt control unit operates at the end-point device mode by coupling the first common terminal of the first switch circuit to the second selection terminal of the first switch circuit, and coupling the first common terminal of the second switch circuit to the second selection terminal of the second switch circuit.

11. The method for switching modes of the Thunderbolt connector of the electronic device according to claim 10, wherein the core unit is disabled when the Thunderbolt control unit operates at the end-point device mode.

12. The method for switching modes of the Thunderbolt connector of the electronic device according to claim 10, further comprising that the Thunderbolt control unit operates at the host mode when the Thunderbolt control unit executes a host mode firmware; and the Thunderbolt control unit operates at an end-device mode when the Thunderbolt control unit executes the end-point device mode firmware.

13. The method for switching modes of the Thunderbolt connector of the electronic device according to claim 12, further comprising:
 resetting the Thunderbolt control unit and executing the host mode firmware via the Thunderbolt control unit to switch from the end-point device mode to the host mode;
 resetting the Thunderbolt control unit and executing the end-point device mode firmware via the Thunderbolt control unit to switch from the host mode to the end-point device mode.

14. The method for switching modes of the Thunderbolt connector of the electronic device according to claim 10, wherein the peripheral device is a GPU, a USB chip, a WLAN chip or an eSATA chip.

* * * * *